(12) United States Patent
Krapf et al.

(10) Patent No.: US 10,147,246 B2
(45) Date of Patent: Dec. 4, 2018

(54) WHEEL BOLT TORQUE MONITORING SYSTEM FOR VEHICLE

(71) Applicant: MAGNA ELECTRONICS INC., Auburn Hills, MI (US)

(72) Inventors: Arno Krapf, Darmstadt (DE); Ruediger Boegel, Großostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/614,926

(22) Filed: Jun. 6, 2017

(65) Prior Publication Data
US 2017/0358155 A1 Dec. 14, 2017

Related U.S. Application Data

(60) Provisional application No. 62/347,836, filed on Jun. 9, 2016.

(51) Int. Cl.
| | | |
|---|---|---|
| *G08B 19/00* | (2006.01) | |
| *G07C 5/08* | (2006.01) | |
| *B60Q 9/00* | (2006.01) | |
| *G01C 21/34* | (2006.01) | |
| *G07C 5/00* | (2006.01) | |
| *B60R 99/00* | (2009.01) | |
| *B60B 3/16* | (2006.01) | |

(52) U.S. Cl.
CPC .......... *G07C 5/0816* (2013.01); *B60Q 9/00* (2013.01); *B60R 99/00* (2013.01); *G01C 21/3415* (2013.01); *G07C 5/006* (2013.01); *G07C 5/0808* (2013.01); *B60B 3/16* (2013.01); *B60B 2900/3312* (2013.01); *B60B 2900/3316* (2013.01); *B60Y 2400/307* (2013.01); *G01C 21/34* (2013.01)

(58) Field of Classification Search
CPC .... G07C 5/0816; G07C 5/0808; G07C 5/006; B60Q 9/00; G01C 21/3415; G01C 21/34; B60Y 2400/307; B60R 99/00; B60B 3/16; B60B 2900/3312; B60B 2900/3316
USPC ................................................... 340/870.09
See application file for complete search history.

(56) References Cited

U.S. PATENT DOCUMENTS

| | | | |
|---|---|---|---|
| 4,546,551 A | 10/1985 | Franks | |
| 4,823,107 A * | 4/1989 | Pompier | B60C 23/0467 340/442 |
| 4,930,951 A * | 6/1990 | Gilliam | B60B 3/16 116/212 |
| 4,953,305 A | 9/1990 | Van Lente et al. | |
| 5,530,240 A | 6/1996 | Larson et al. | |

(Continued)

*Primary Examiner* — Kerri L McNally
*Assistant Examiner* — Thang D Tran
(74) *Attorney, Agent, or Firm* — Honigman Miller Schwartz and Cohn, LLP (57) ABSTRACT

A wheel bolt torque monitoring system for a vehicle includes a torque sensor disposed at each bolt that is used to mount a wheel at a wheel mount of a vehicle. A transmitting device is disposed at the wheel mount of the vehicle, and the transmitting device receives data from the torque sensors at the wheel mounted at the wheel mount. The transmitting device transmits data to a control unit, which processes data received from the transmitting device to determine when a torque at a bolt is below a threshold torque level. Responsive to the control unit determining that a torque at a bolt is below the threshold torque level, the control unit generates an alert.

20 Claims, 5 Drawing Sheets

(56) References Cited

U.S. PATENT DOCUMENTS

| | | |
|---|---|---|
| 5,576,687 A | 11/1996 | Blank et al. |
| 5,632,092 A | 5/1997 | Blank et al. |
| 5,668,663 A | 9/1997 | Varaprasad et al. |
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |
| 5,802,727 A | 9/1998 | Blank et al. |
| 5,878,370 A | 3/1999 | Olson |
| 6,087,953 A | 7/2000 | DeLine et al. |
| 6,124,886 A | 9/2000 | DeLine et al. |
| 6,222,460 B1 | 4/2001 | DeLine et al. |
| 6,294,989 B1 | 9/2001 | Schofield et al. |
| 6,329,925 B1 | 12/2001 | Skiver et al. |
| 6,386,742 B1 | 5/2002 | DeLine et al. |
| 6,445,287 B1 | 9/2002 | Schofield et al. |
| 6,513,252 B1 | 2/2003 | Schierbeek |
| 6,642,851 B2 | 11/2003 | Deline et al. |
| 6,672,744 B2 | 1/2004 | DeLine et al. |
| 6,690,268 B2 | 2/2004 | Schofield et al. |
| 6,693,517 B2 | 2/2004 | McCarthy et al. |
| 6,824,281 B2 | 11/2004 | Schofield et al. |
| 6,877,888 B2 | 4/2005 | DeLine et al. |
| 7,004,593 B2 | 2/2006 | Weller et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,412,898 B1* | 8/2008 | Smith ................... G01L 5/24 73/761 |
| 7,446,650 B2 | 11/2008 | Scholfield et al. |
| 7,580,795 B2 | 8/2009 | McCarthy et al. |
| 7,581,859 B2 | 9/2009 | Lynam |
| 7,626,749 B2 | 12/2009 | Baur et al. |
| 7,855,755 B2 | 12/2010 | Weller et al. |
| 7,873,449 B2* | 1/2011 | Bujak ............. B60C 23/0481 340/442 |
| 8,139,905 B1* | 3/2012 | Bazzone ......... G01K 11/3206 250/227.11 |
| 2005/0083186 A1* | 4/2005 | Hayes ................... B60B 3/08 340/438 |
| 2005/0103413 A1* | 5/2005 | Tozawa .................. B60C 9/02 152/152.1 |
| 2006/0050018 A1 | 3/2006 | Hutzel et al. |
| 2006/0061008 A1* | 3/2006 | Karner ............. B29C 45/0017 264/250 |
| 2008/0243327 A1* | 10/2008 | Bujak ................. B60W 30/12 701/33.7 |
| 2009/0207008 A1* | 8/2009 | Malis ..................... B60B 3/16 340/438 |
| 2010/0274230 A1* | 10/2010 | Edgell ................ A61N 1/3752 606/1 |
| 2012/0062743 A1* | 3/2012 | Lynam ................. B60Q 9/005 348/148 |
| 2012/0162427 A1 | 6/2012 | Lynam |
| 2012/0191378 A1* | 7/2012 | Chu ........................ G01L 5/24 702/41 |
| 2012/0218412 A1 | 8/2012 | Dellantoni et al. |
| 2013/0030653 A1* | 1/2013 | Soos ................... B62D 5/0424 701/41 |
| 2013/0218400 A1* | 8/2013 | Knoop ................... G06F 17/00 701/31.4 |
| 2013/0222592 A1 | 8/2013 | Gieseke |
| 2013/0302758 A1* | 11/2013 | Wright ................... G07C 5/008 434/65 |
| 2014/0218529 A1 | 8/2014 | Mahmoud et al. |
| 2014/0331831 A1* | 11/2014 | King ................. B25B 23/1425 81/479 |
| 2014/0375476 A1 | 12/2014 | Johnson et al. |
| 2015/0041162 A1* | 2/2015 | Chu ................. B25B 23/1456 173/1 |
| 2015/0066412 A1* | 3/2015 | Nordbruch ............ G07C 5/008 702/104 |
| 2015/0081157 A1* | 3/2015 | Banasky, Jr. .......... G01C 21/26 701/29.1 |
| 2015/0124096 A1 | 5/2015 | Koravadi |
| 2015/0158499 A1 | 6/2015 | Koravadi |
| 2015/0240880 A1* | 8/2015 | Straub .................... F16D 7/021 192/54.2 |
| 2015/0251599 A1 | 9/2015 | Koravadi |
| 2015/0352953 A1 | 12/2015 | Koravadi |
| 2016/0009256 A1* | 1/2016 | Dondurur ................ B60S 9/12 254/423 |
| 2016/0036917 A1 | 2/2016 | Koravadi et al. |
| 2016/0159173 A1* | 6/2016 | Schneider .......... B60C 23/0486 701/70 |
| 2016/0210853 A1 | 7/2016 | Koravadi |
| 2017/0144658 A1 | 5/2017 | Viehmann |
| 2017/0305214 A1* | 10/2017 | Gray ..................... B60D 1/248 |

\* cited by examiner

WHEEL BOLT TORQUE MONITORING SYSTEM FOR VEHICLE

CROSS REFERENCE TO RELATED APPLICATION

The present application claims the filing benefits of U.S. provisional application Ser. No. 62/347,836, filed Jun. 9, 2016, which is hereby incorporated herein by reference in its entirety.

FIELD OF THE INVENTION

The present invention relates generally to a vehicle tire monitoring system.

BACKGROUND OF THE INVENTION

It is known to monitor air pressure of the tires of the vehicle and to alert the driver when pressure in one or more tires falls below a threshold level. Examples of tire pressure monitoring systems are described in U.S. Pat. Nos. 6,445,287 and 6,294,989, which are hereby incorporated herein by reference herein in their entireties.

SUMMARY OF THE INVENTION

The present invention provides a wheel bolt torque monitoring system that monitors the torque on the lug nuts or bolts that hold the wheels at the corner assemblies of a vehicle. When the system determines that one or more of the fasteners is getting loose, an alert is generated to alert the driver or occupant or service entity of a potentially hazardous condition.

These and other objects, advantages, purposes and features of the present invention will become apparent upon review of the following specification in conjunction with the drawings.

LEGEND

10 Vehicle
12 Torque Monitoring System
14 Sending Electronics Device (ED)
16 Central Receiving, Processing and Control Unit (PU)
18 Display Device
20 Interior Rearview Mirror Assembly
21 Non-Vehicle Inherent Aftermarket Unit or Smart Phone
22 Tire's Rim
24 Wheel Bolt
26 Electrical Interface
28 Drum
30 Receiving and Processing Unit (PU)

DESCRIPTION OF THE PREFERRED EMBODIMENTS

Figure 1:
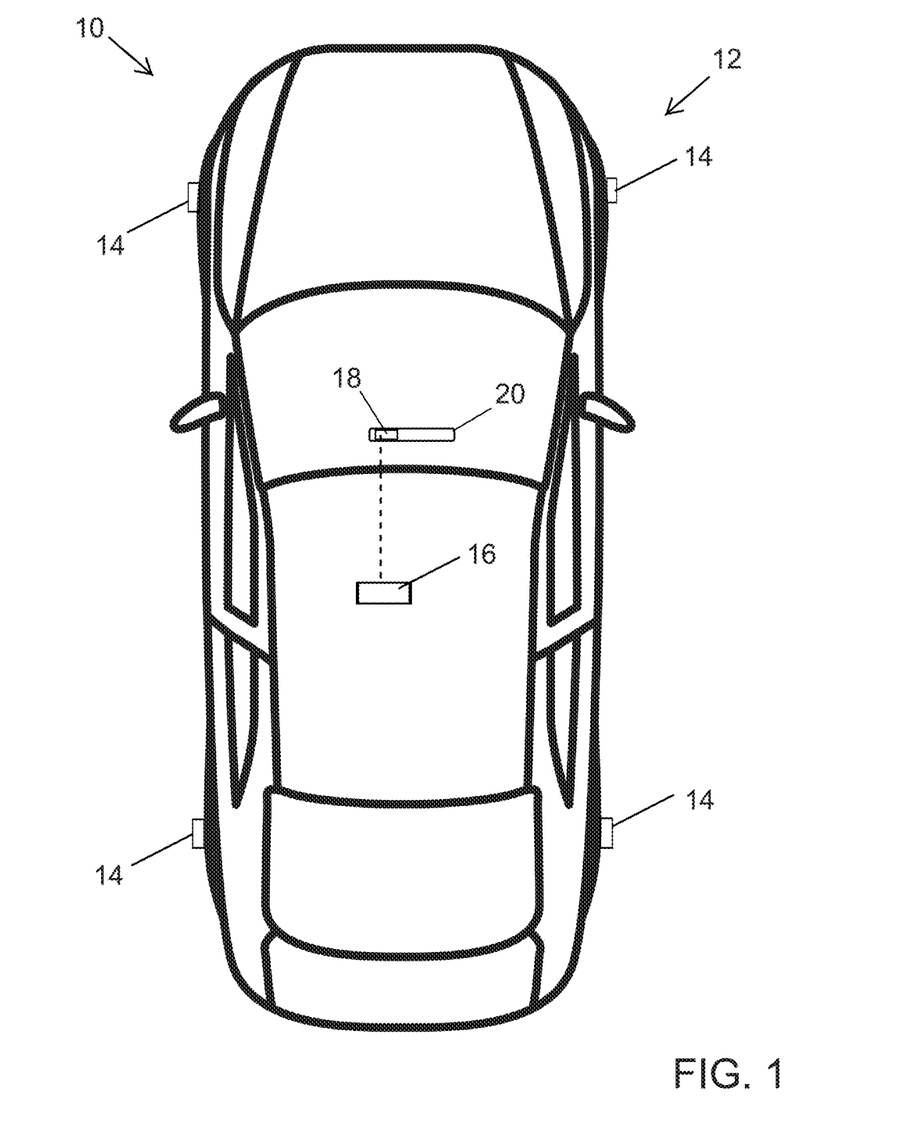
FIG. 1 is a plan view of a vehicle with a torque monitoring system in accordance with the present invention.

Referring now to the drawings and the illustrative embodiments depicted therein, a vehicle 10 includes a torque monitoring system 12 that includes a plurality of torque sensors (such as a torque sensor at each of at least four bolts at each wheel) and a transmitter or sending device 14 at the wheels of the vehicle (FIG. 1). The sensors monitor the torque at the wheel bolts and the transmitter 14 transmits data or information to a control 16 of the system. Responsive to a determination of a torque falling below a threshold torque level, the control may generate an alert to the driver of the vehicle, such as at a display 18 at a mirror assembly 20 of the vehicle.

Figure 2:
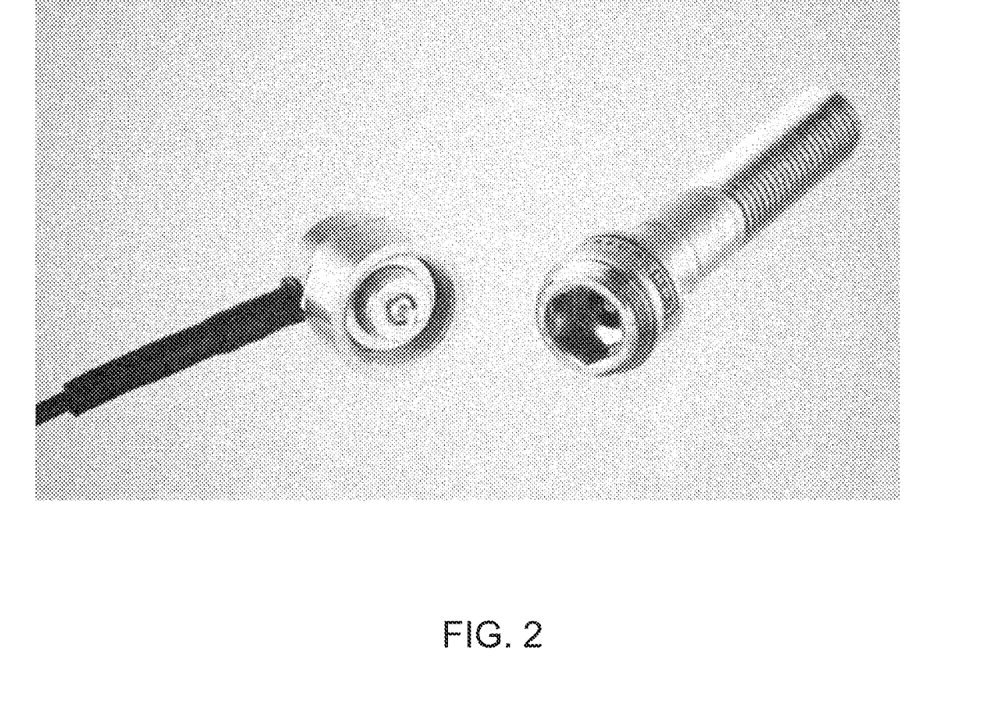
FIG. 2 is a perspective view of a known torque sensor that senses torque at the head of a bolt.
Figure 3:
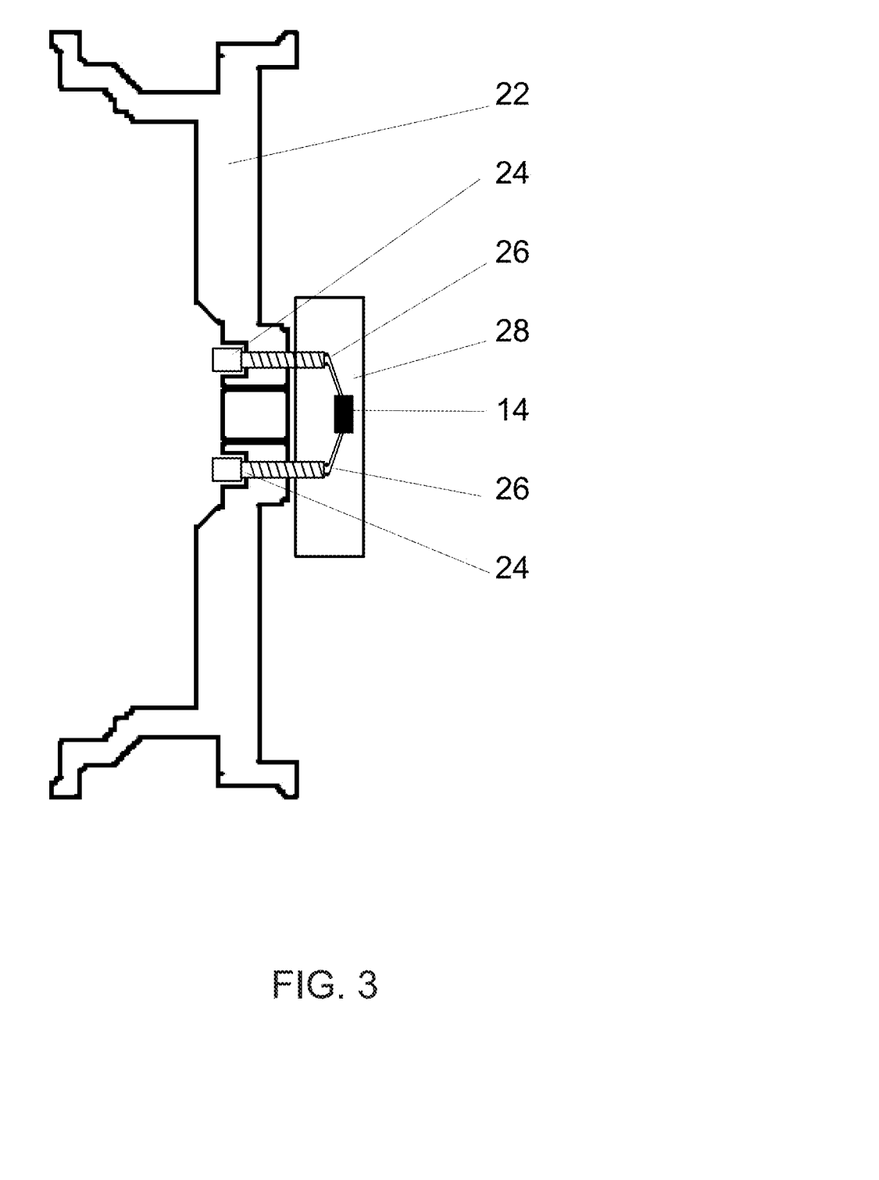
FIG. 3 is a sectional view of a wheel attached to a drum via bolts that are electrically connected to a transmitting device at the drum that communicates torque data to a processing unit in accordance with the present invention.

For implementing a vehicle tire bolt (or wheel bolt) monitoring system (similar to tire pressure monitoring system, but for monitoring the tire bolts instead of the tire pressure) for preventing loose bolts or losing bolts (causing loose wheels/tires or losing wheels/tires) the mounting torque of several or all of the bolts of the vehicle's wheels may be monitored by using torque measuring tire bolts. Different from bolts of ConSenses (from which the PiezoBolts of FIG. 2 are commercially available for industrial use, which have integrated torque measuring capabilities), the electrical interface 26 of a tire bolt 24 according the present invention may not be at the head but at the screw far end side. The electrical interface may conduct to a counter plug embedded at the end of the thread of the wheel drum 28 (or wheel saddle or corner assembly) that the bolts gets screwed or threaded into. The bolts' electrical interfaces may be conducted to a processing and data sending electronics device (ED) 14 at the wheel drum or corner assembly.

Figure 4:
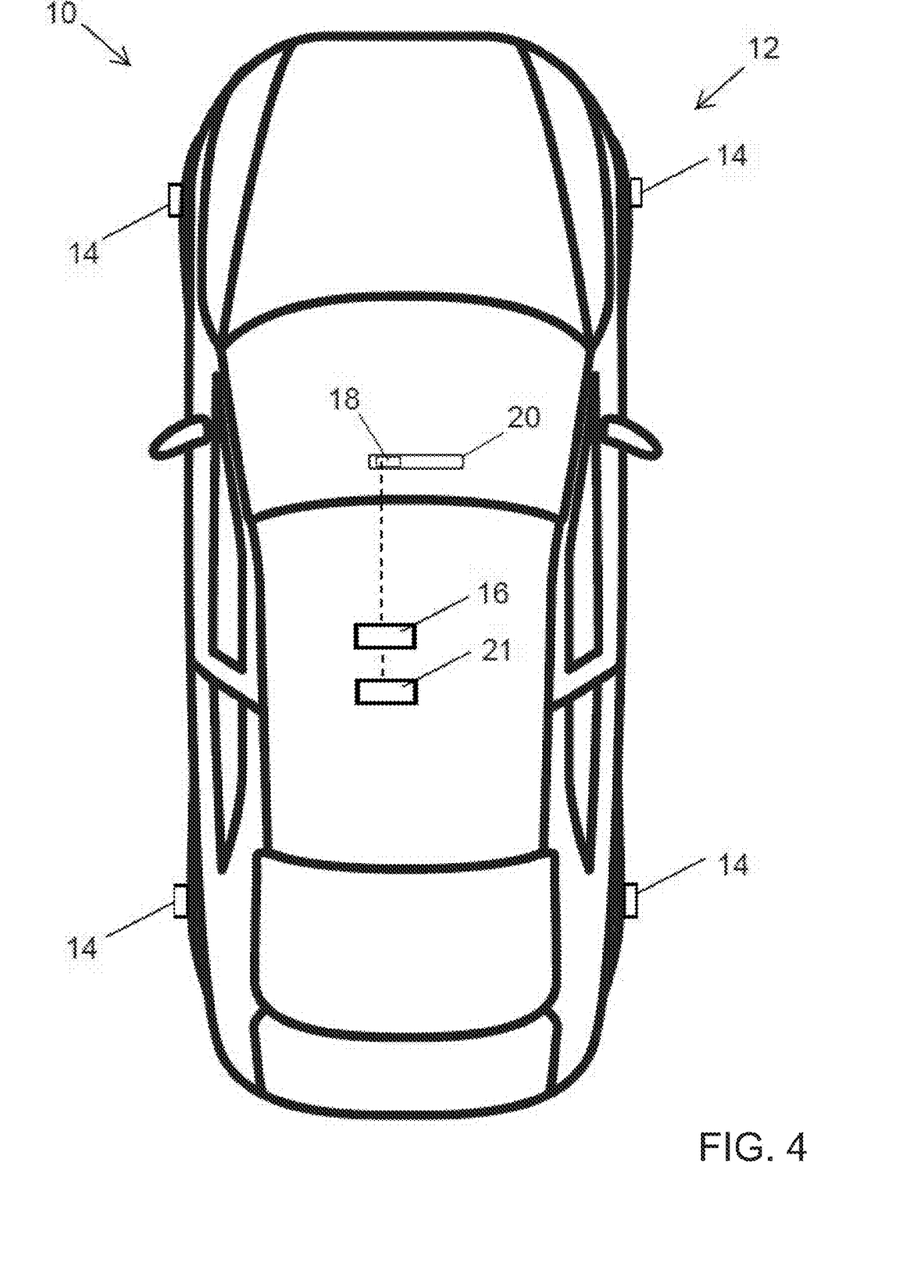
FIG. 4 is a plan view of a vehicle with a torque monitoring system in accordance with an optional configuration of the present invention, shown with a smart phone 21 attached to or connected to or in communication with the processing and control unit (PU) 16 that is wirelessly connected with the sending electronic devices 14.

Each wheel may include a respective data sending electronics device. The data sending electronics devices may send the status of the torque of the bolts of each wheel to a central receiving, processing and control unit (PU) 16 wirelessly (via Bluetooth, WiFi, NTSC, or such standards). The processing unit 16 may be connected to a communication or network bus (such as a CAN bus or the like) of the vehicle or other physical data line or vehicle bus (non-wirelessly). The processing unit may be vehicle inherent (such as already existing in the vehicle for other purposes). Optionally, there may be an extra aftermarket unit or smart phone 21 attached to or connected to or in communication with the vehicle, preferably via the PU 16 as shown in FIG. 4, and having the wireless data communication capabilities for receiving the ED's data signals. Depending on the architecture, the signal processing may take place in the data sending electronics devices or in the processing unit or in a main processing system of the vehicle, preferably the processing is done centralized in the processing unit. The data processing may optionally take place fully on the optional aftermarket device or smart phone or partially on the optional aftermarket device or smart phone and partially on the vehicle inherent processing unit 16.

The processing unit may process whether a (one or more) bolt has reached a certain minimal torque when being mounted newly and may monitor whether a bolt is losing torque over a longer period of time or rapidly losing torque when in use. The system may optionally have algorithms to compensate for the torque sensor's temperature drift or tolerance band to prevent the system from providing false positive warnings to the driver. When the torque diminishes below a certain minimal torque or threshold torque, the system may generate an alarm or message which brings the malfunctioning bolt mounting to the vehicle driver's or owner's attention, who then may stop the vehicle to inspect the vehicle's wheel bolts. For example, for an autonomous vehicle, the system may generate an alert to the vehicle owner or service entity so the vehicle is brought in for service. If the torque is determined to be below an "urgent" low torque, the system may generate an output so the vehicle is autonomously driven to a service station or facility or is pulled over and stopped.

Figure 5:
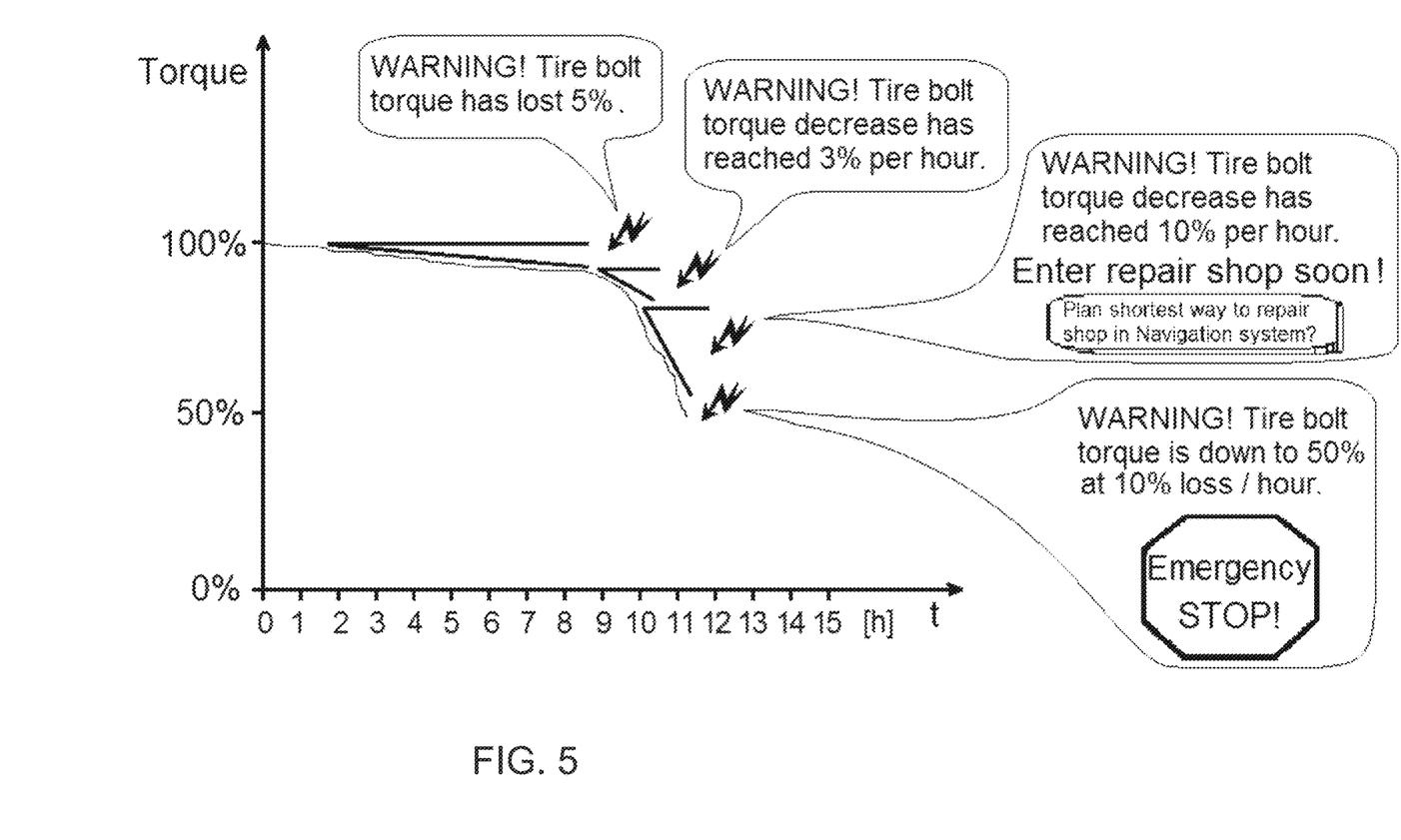
FIG. 5 is a chart of a tire bolt torque monitored by the system of the present invention, showing that torque loosening quotients may increase over time and, as indicated, the system may output four (or more or less) alerts or warnings with increasing severity of bolt torque loss over time, with the system generating the warnings via displaying text alerts such as shown in FIG. 5 and/or via audible alerts.

The system may also monitor the ratio at which one or multiple tire bolts are losing torque. There may be thresholds of torque losing or loosening quotients (torque per hour or torque per mile) in percentage or calculated absolute values which may trigger warning levels of the severity of losing tire bolt torque, such as shown in the example of FIG. 5. As shown in FIG. 5, the system may prompt to the driver to "Enter a repair shop soon" or to "emergency stop" depending on the determined tire bolt torque status.

The system thus can provide an alert that one or more bolts are at an improper torque level. Optionally, the system may generate an alert indicating that an under-torqued bolt has been determined, without any further information about the determined bolt location. Optionally, the system may generate an alert indicating that a particular wheel has an under-torqued bolt, or optionally, the system may generate an alert indicating the particular under-torqued bolt at a particular wheel.

Optionally, the system according the invention may have means to detect whether the electrical interface is still connected to the tire bolt. This may happen by distinguishing the electrical resistance, where an open circuit may lead to a conclusion of a "lost bolt." When the torque is essentially at zero but the electrical interface 26 (connector) still detects the presence of the bolt, the system according the invention may conclude that the tire is not fully fixed any more but "loose." The system may prompt the appropriate alerts or warnings to the driver.

The vehicle owner may be different from the driver. Optionally, the owner may be informed or alerted via a UMTS connection, optionally to his or her smartphone. The message or alarm or alert to the driver may be acoustic or audible, or haptic or visual, such as via a display device 18.

Clearly, having a loosening wheel or being unaware before losing a tire is a severe situation. By that the monitoring system may provide alarms or messages when a bolt has initially lost some (a defined amount of) torque but still has sufficient torque to retain the wheel and tire at the vehicle.

A wheel bolt loses torque mostly due to under or over torqueing the bolt when the wheel and tire are mounted at the vehicle. When under-torqued, the bolt can turn when vibrating, so this may occur when the vehicle is driven. When over-torqued, the bolt's or wheel drum's threads can become damaged, stretched or cracked. Then it may appear that the bolt slips one thread under changing load while the vehicle is driven.

The system of the present invention may employ algorithms to detect the initial torque on each wheel bolt, to filter long time or short time dips of the bolt's torque and to filter or process diminishing characteristics which may isolate the cause of losing torque, optionally repeatedly (after manually re-torqueing), on the same or several bolts to advise the driver or vehicle owner or vehicle service whether a bolt or drum thread is damaged. Expert details may be stored in an On Board Diagnostics (OBD) interface that is readable by a technician at a vehicle service station.

As an alternative to the interface solution above, each wheel bolt may have a wireless interface (itself) at its end instead of having a plug, such as a RFID interface, which is advantageous in terms of dirt. Plug connectors may tend to fail due to dirt while a RFID interface can be done as a closed housing, by that being comparably robust against dirt or contamination. The RFID-bolts may transmit to the processing unit directly or its data may be received by the electronics device 14 and forwarded to the processing unit 16 by the electronics device 14.

The system may also communicate between components via any suitable wired or wireless communication means. Optionally, the system may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499: US-2015-0124096; US-2015-0352953; US-2016-0036917 and/or US-2016-0210853, which are hereby incorporated herein by reference in their entireties.

Optionally, vehicle dynamic control systems for emergency handling, such as of the types described in U.S. Publication No. US-2017-0144658, which is hereby incorporated herein by reference in its entirety, may take advantage of the tire bolt torque or tire loose or tire lost information to prepare for emergency handling or to control emergency steering interventions more properly. This is since the system can take the according wheel and the control system behavior of a loose or lost tire into account for its control (control behavior and parameter). Optionally, when the driver is carrying on driving despite human interface (HMI) prompts or alerts to stop, the vehicle dynamic control for emergency handling systems may substantially or massively reduce and limit (control) the driving speed automatically for the safety of the vehicle driver and occupants, and for the safety of other vehicles' occupants and bystanders.

Optionally, the vision system may include a display for displaying the alert or message and/or for displaying images captured by one or more vehicle cameras for viewing by the driver of the vehicle while the driver is normally operating the vehicle. Optionally, for example, the system may include a display device that may utilize aspects of the display systems described in U.S. Pat. Nos. 5,530,240; 6,329,925; 7,855,755; 7,626,749; 7,581,859; 7,446,650; 7,338,177;

7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A wheel bolt torque monitoring system for a vehicle, said wheel bolt torque monitoring system comprising:
    a torque sensor disposed at each bolt of a plurality of bolts that are used to mount a wheel at a wheel mount of a vehicle;
    a transmitting device disposed at the wheel mount of the vehicle, wherein said transmitting device receives data from said torque sensors at the wheel mounted at the wheel mount;
    a control unit;
    wherein said transmitting device transmits data to said control unit;
    wherein said control unit processes data received from said transmitting device to determine when a torque at a bolt of the plurality of bolts is below a threshold torque level;
    wherein said control unit processes data received from said transmitting device to determine when the torque at the bolt of the plurality of bolts is decreasing at a rate greater than a threshold rate;
    wherein, responsive to said control unit determining that the torque at the bolt is below the threshold torque level, said wheel bolt torque monitoring system generates a first alert; and
    wherein, responsive to said control unit determining that the torque at the bolt is decreasing at a rate greater than the threshold rate, said wheel bolt torque monitoring system generates a second alert.

2. The wheel bolt torque monitoring system of claim 1, wherein said torque sensor is at the end of the bolt opposite a head of the bolt.

3. The wheel bolt torque monitoring system of claim 1, wherein said transmitting device wirelessly transmits data to said control unit.

4. The wheel bolt torque monitoring system of claim 1, wherein one of said torque sensors is disposed at each of the plurality of bolts used to mount each of a plurality of wheels at respective wheel mounts of the vehicle.

5. The wheel bolt torque monitoring system of claim 4, wherein each wheel is mounted at the respective wheel mount via at least four bolts.

6. The wheel bolt torque monitoring system of claim 1, wherein said control unit generates the first alert responsive to determination that the torque at the bolt is below a first threshold torque level, and wherein said control unit generates a third alert responsive to determination that the torque at the bolt is below a second threshold torque level.

7. The wheel bolt torque monitoring system of claim 1, wherein the second threshold torque level is below the first threshold torque level and wherein the third alert is more urgent than the first alert.

8. The wheel bolt torque monitoring system of claim 1, wherein, responsive to said control unit determining that a torque at a bolt is decreasing at a rate greater than a second threshold rate that is greater than the first threshold rate, said wheel bolt torque monitoring system generates a third alert, and wherein the second threshold rate is indicative of the torque decreasing toward a dangerously low torque level, and wherein the third alert comprises an instruction to stop the vehicle.

9. The wheel bolt torque monitoring system of claim 1, wherein the second alert comprises an instruction to drive to a repair facility.

10. The wheel bolt torque monitoring system of claim 9, wherein said system provides driving instructions to the nearest repair facility via a navigation system of the vehicle.

11. The wheel bolt torque monitoring system of claim 1, wherein said control unit comprises a vehicle-based control unit of the vehicle.

12. The wheel bolt torque monitoring system of claim 1, wherein said control unit comprises a mobile device of an occupant of the vehicle.

13. The wheel bolt torque monitoring system of claim 1, wherein said control unit comprises a receiver of the vehicle that receives data from said transmitting device, and wherein a mobile device of an occupant of the vehicle communicates with said receiver and processes the received data to determine when the torque at the bolt is below the threshold torque level and to determine when the torque at the bolt is decreasing at a rate greater than the threshold rate.

14. The wheel bolt torque monitoring system of claim 13, wherein the mobile device generates the first and second alerts.

15. The wheel bolt torque monitoring system of claim 1, wherein, responsive to the torque at the bolt being below the threshold torque level, said wheel bolt torque monitoring system provides an output to an emergency handling system of the vehicle.

16. A wheel bolt torque monitoring system for a vehicle, said wheel bolt torque monitoring system comprising:
    a torque sensor disposed at each bolt of a plurality of bolts that are used to mount each wheel of a plurality of wheels at a respective wheel mount of a vehicle;
    a transmitting device disposed at each wheel mount of the vehicle, wherein said transmitting device receives data from said torque sensors at the wheel mounted at the respective wheel mount;
    a control unit;
    wherein said transmitting device transmits data to said control unit;
    wherein said control unit processes data received from said transmitting device to determine when a torque at a bolt is below a threshold torque level;
    wherein said control unit processes data received from said transmitting device to determine when the torque at the bolt of the plurality of bolts is decreasing at a rate greater than a threshold rate;

wherein, responsive to said control unit determining that the torque at the bolt is below the threshold torque level, said wheel bolt torque monitoring system generates an alert;

wherein, responsive to said control unit determining that the torque at the bolt is decreasing at a rate greater than the threshold rate, said wheel bolt torque monitoring system generates a second alert; and wherein, responsive to determination that (i) the torque at the bolt is below the threshold torque level and (ii) the torque at the bolt is decreasing at a rate greater than the threshold rate, said wheel bolt torque monitoring system provides an output to an emergency handling system of the vehicle.

17. The wheel bolt torque monitoring system of claim 16, wherein said control unit communicates with a mobile device of an occupant of the vehicle.

18. A wheel bolt torque monitoring system for a vehicle, said wheel bolt torque monitoring system comprising:

a torque sensor disposed at each bolt of a plurality of bolts that are used to mount each wheel of a plurality of wheels at a respective wheel mount of a vehicle;

a transmitting device disposed at each wheel mount of the vehicle, wherein said transmitting device receives data from said torque sensors at the wheel mounted at the respective wheel mount;

a control unit;

wherein said transmitting device transmits data to said control unit;

wherein said control unit processes data received from said transmitting device to determine when a torque at a bolt is below a threshold torque level;

wherein said control unit processes data received from said transmitting device to determine when the torque at the bolt of the plurality of bolts is decreasing at a rate greater than a threshold rate;

wherein, responsive to said control unit determining that a torque at a bolt is below a first threshold torque level, said wheel bolt torque monitoring system generates a first alert;

wherein, responsive to said control unit determining that the torque at the bolt is below a second threshold torque level, said wheel bolt torque monitoring system generates a second alert;

wherein the second threshold torque level is a lower torque than the first threshold torque level and wherein the second alert is more urgent than the first alert; and wherein, responsive to said control unit determining that the torque at the bolt is below a second threshold torque level and that the torque at the bolt is decreasing at a rate greater than a threshold rate, said wheel bolt torque monitoring system generates a third alert, and wherein the third alert is more urgent than the second alert.

19. The wheel bolt torque monitoring system of claim 18, wherein the threshold rate is indicative of the torque decreasing toward a dangerously low torque level, and wherein the third alert comprises an instruction to stop the vehicle.

20. The wheel bolt torque monitoring system of claim 18, wherein the second threshold torque level is at a lower torque level than the first threshold torque level, and wherein the second alert comprises an instruction to drive to a repair facility.

* * * * *